(12) United States Patent
Lötters et al.

(10) Patent No.: US 9,851,232 B2
(45) Date of Patent: Dec. 26, 2017

(54) ULTRASONIC FLOW METER

(71) Applicant: BERKIN B.V., Ruurlo (NL)

(72) Inventors: Joost Conrad Lötters, Ruurlo (NL);
Gert Jan Snijders, Ruurlo (NL); Arno Willem Frederik Volker, Ruurlo (NL)

(73) Assignee: BERKIN B.V., Ruurlo (NL)

( * ) Notice: Subject to any disclaimer, the term of this patent is extended or adjusted under 35 U.S.C. 154(b) by 0 days.

(21) Appl. No.: 15/304,280

(22) PCT Filed: Apr. 17, 2014

(86) PCT No.: PCT/NL2014/050249
§ 371 (c)(1),
(2) Date: Oct. 14, 2016

(87) PCT Pub. No.: WO2015/160235
PCT Pub. Date: Oct. 22, 2015

(65) Prior Publication Data
US 2017/0038234 A1 Feb. 9, 2017

(51) Int. Cl.
*G01F 1/66* (2006.01)
(52) U.S. Cl.
CPC .............. *G01F 1/667* (2013.01); *G01F 1/662* (2013.01)
(58) Field of Classification Search
CPC ................ G01F 1/66; G01F 1/20; G01F 1/58
See application file for complete search history.

(56) References Cited

U.S. PATENT DOCUMENTS

| | | | | |
|---|---|---|---|---|
| 4,164,865 A * | 8/1979 | Hall | ........................... | G01F 1/66 73/861.28 |
| 5,974,897 A * | 11/1999 | Koyano | ................... | G01F 1/662 73/861.29 |
| 6,055,868 A * | 5/2000 | Koyano | ................... | G01F 1/667 73/861.28 |
| 6,681,642 B2 * | 1/2004 | Ohkawa | ................... | G01F 1/662 264/295 |
| 7,469,598 B2 * | 12/2008 | Shkarlet | ............... | A61B 5/6876 600/459 |
| 8,714,030 B1 * | 5/2014 | Liu | ........................... | G01F 1/662 73/861.28 |
| 9,347,809 B2 * | 5/2016 | Iwasa | ....................... | G01F 1/662 |
| 2012/0017700 A1 * | 1/2012 | Wiest | ....................... | G01F 1/662 73/861.28 |
| 2013/0180342 A1 * | 7/2013 | Shen | ........................ | G01F 1/662 73/861.25 |

* cited by examiner

*Primary Examiner* — Jewel V Thompson
(74) *Attorney, Agent, or Firm* — Casimir Jones S.C.

(57) ABSTRACT

The invention relates to an ultrasonic flow meter comprising a flow tube for the fluid whose flow rate is to be determined. The flow meter comprises a transmitting element for emitting ultrasonic waves, which is provided on the outer jacket of the flow tube. A receiving element, which is provided on the outer jacket of the flow tube, is axially spaced from the transmitting element. An influencing element is provided between the transmitting element and the receiving element for influencing the velocity and/or the direction of a portion of the ultrasonic waves.

25 Claims, 4 Drawing Sheets

ULTRASONIC FLOW METER

The invention relates to an ultrasonic flow meter comprising a flow tube for the fluid whose flow rate is to be determined, wherein the flow meter comprises a transmitting element for emitting ultrasonic waves, which is provided on the outer jacket of the flow tube, and wherein the flow meter comprises a receiving element for the ultrasonic waves, which is provided on the outer jacket of the flow tube.

Such a flow meter is known, for example from U.S. Pat. No. 6,055,868, which flow meter comprises a flow tube on which two ring-shaped oscillators are provided. The oscillators are alternately energized to emit ultrasonic waves, which waves are detected by the other, non-energized oscillator. The time the ultrasonic waves require to propagate upstream and the time the new ultrasonic waves require for propagating downstream, as well as the time difference therebetween, is used for determining the velocity of the flow in the flow tube.

The time difference is determined inter alia by the diameter of the flow tube, the angle at which the ultrasonic waves propagate, and the velocity of the flow. When these flow meters are reduced in size, the time difference will become very small, viz, in the order of picoseconds ($10^{-12}$ s). In order to still be able to measure this time difference, very high frequencies are required, in the order of gigahertz (GHz). The fact that fluids often damp these high frequencies is disadvantageous.

It is an object of the present invention to provide an improved ultrasonic flow sensor, which can also be used with relatively small flows.

In order to achieve that object, the invention provides an ultrasonic flow meter which is characterised in that an influencing element is provided on at least a portion of a part of the flow tube that extends from the transmitting element up to and including the receiving element, which influencing element functions to influence the velocity and/or the direction of at most a portion of the ultrasonic waves. The influencing element is provided on a part of the outer jacket that is located in an area of the flow tube that extends from the transmitting element up to and including the receiving element. It may cover the entire area, but also only a portion thereof. The influencing element is for example a material layer comprising epoxy or a composite thereof.

It has been found that according to the invention an improved signal/noise ratio is obtained at the location of the receiver. Without wishing to be theoretically bound by this, a possible explanation for this surprising effect will be given below merely by way of illustration.

The use of two ring-shaped oscillators (one transmitter and one receiver) causes the ultrasonic waves to propagate parallel to the longitudinal axis of the tube. The ultrasonic waves in that case propagate at least in part over the tube-fluid surface. The distance travelled by the waves between the transmitter and the receiver is thus independent of the diameter of the tube. This means that the flow meter can be designed to be relatively small-sized. By further designing the distance between the transmitter and the receiver to be sufficiently large, it becomes possible to obtain a measurable time for determining the flow rate.

A drawback, however, is the fact that as a result of the use according to the prior art of two ring-shaped oscillators leads, a relatively highly complex wave pattern is generated. In the flow tube according to the invention, Stoneley waves are mainly generated, i.e. a surface wave on the interface of a solid (the flow tube) and a fluid (so-called Scholte wave). Said Stoneley wave is influenced by the flow of the medium whose flow is to be determined. However, a portion of the ultrasonic waves being generated will not be a Stoneley wave, but propagate entirely in the solid matter of the flow tube, for example. This wave disturbs the desired signal. In addition, this wave propagates faster than the waves that do interact with the fluid, but this wave is not damped yet, so that this wave influences the measurement.

By making use of the influencing element, which is designed to delay, accelerate, deflect, damp or influence otherwise at most a portion of the ultrasonic waves (i.e. at least a portion of the waves that do not interact with the fluid to be measured), in particular said latter waves are influenced to such an extent that they cannot reach the receiver, or reach it outside the time window that is used for the measurement. At least a portion of precisely those waves that do not interact with the fluid are thus influenced to such an extent that they arrive at the receiver at an earlier or later point in time (or not at all) in comparison with the waves that do interact with the fluid. The result is, therefore, an improved signal/noise ratio, which is more representative of the flow.

It is thus apparent that an improved ultrasonic flow sensor has been obtained which, in addition, can also be designed to be relatively small-sized. The object of the present invention is thus achieved.

From the above explanation it furthermore appears that the influencing element is preferably designed to deflect, delay, accelerate and/or absorb a portion of the ultrasonic waves during use of the device.

It is preferable in that regard that the influencing element is configured so that it does not influence the Stoneley wave, for example in that it appears to the Stoneley wave as if the influencing element is not there. In one embodiment, this can be achieved by ensuring that the influencing element has a suitable acoustic impedance. In that case, however, the acoustic impedance is selected so that the other waves, on the other hand, are at least in part influenced by the influencing element.

The influencing element is preferably a passive element, i.e. it can operate without electrical or mechanical components. In one embodiment, it is for example a material layer (such as an epoxy layer or an epoxy composite) provided on the outer jacket.

In one embodiment, the influencing element is provided at least on a part of the outer jacket of the flow tube that is present between the transmitting element and the receiving element. The influencing element may thus be provided somewhere between the transmitting element and the receiving element, and consequently be provided only on a relatively small part of the outer jacket of the flow tube.

In one embodiment, the transmitting element and/or the receiving element is/are surrounded by the influencing element. It is conceivable in that regard that the transmitting element and/for the receiving element is/are surrounded by the influencing element in such a manner that the transmitting element and/or the receiving element is/are forced to emit and/or receive the desired waves and that, on the contrary, the emission of undesirable waves is prevented. This is for example the case in an embodiment in which a flow tube comprising a transmitter and a receiver is moulded in epoxy, or a composite thereof.

In a special embodiment, only the receiving element is surrounded by the influencing element, for example a material layer consisting of epoxy. In this way it is ensured that the undesirable waves are deflected and/or delayed at the location of the receiver, so that they will not reach the receiver (or at an earlier or later point in time).

In another embodiment, on the contrary, only the transmitter is surrounded by the influencing element. It is assumed, however, that in this embodiment, undesirable signals may nevertheless occur again, so that a relatively complex signal is measured yet.

In one embodiment it is furthermore conceivable that the influencing element fully surrounds the flow tube in circumferential direction. Also in this case it obtains that a small axial part of the flow tube may be provided with the influencing element, or that a relatively large part (including the transmitter and/or receiver) is provided with the influencing element. The influencing element may be a material layer that fully extends in the circumferential direction. In this latter case, the flow tube, possibly with the transmitting element and/or the receiving element, is surrounded, as it were, by a second, larger tube that is made up of the material of the influencing element.

The thickness of the influencing element can influence the deflection of a portion of the ultrasonic waves. It has been found that in the case of a (stainless) steel flow tube and an epoxy material layer, good results are obtained if a ratio between the thickness of the influencing element, measured in the radial direction of the flow tube, and the wall thickness of the flow tube is equal to or greater than 5. For other materials, a different ratio may be required. In one embodiment, the thickness of the influencing element is greater than the thickness of the transmitting element and/or the receiving element, in which case any ratio between the thickness of the influencing element and the wall thickness of the flow tube is in principle possible.

In a relatively simple embodiment, which is also relatively easy to produce, the receiving element comprises a piezo element. Said piezo element may comprise a relatively thin piezo film.

In a very suitable embodiment, the receiving element comprises a polyvinylidene fluoride or polyvinylidene difluoride (PVDF) material. PVDF has a very strong piezoelectric effect, and PVDF is in particular suitable for generating a voltage when the material is set vibrating.

Furthermore, it is conceivable to use a PZT element, a ceramic crystal that can function as a transmitter and/or receiver.

The flow tube may be a metal flow tube, in particular made of stainless steel. Alternatively, hastelloy may be a suitable material. For certain uses, non-metals may be used. Think in this connection of teflon, PEEK, but also glass or a ceramic material.

In one embodiment, the transmitting element and/or the receiving element is/are provided at least substantially entirely around the flow tube. In this way a substantially rotation-symmetrical signal is obtained, and essentially an average of the flow will be determined if the flow should not be entirely uniform.

The transmitting element is preferably in acoustic contact with the outer jacket of the flow tube, for example in that it is directly connected thereto, or is provided thereon via an acoustically conductive (preferably thin) layer.

To obtain an even more precise measurement of the signal, it is conceivable that the flow meter comprises a further receiving element for the ultrasonic waves, which is provided on the outer jacket of the flow tube.

In one embodiment, said further receiving element is axially spaced from the transmitting element, such that the transmitting element is disposed between the receiving element and the further receiving element. The transmitting element is in that case disposed centrally between the receiving element and the further receiving element, for example, such that an ultrasonic wave that propagates upstream and an ultrasonic wave that propagates downstream will be measured by the receiving element and the further receiving element.

It is furthermore possible for the flow meter to comprise a further transmitting element for the ultrasonic waves, which is provided on the outer jacket of the flow tube. Said further transmitting element may be spaced from the transmitting element. The location can be such that the receiving element is disposed between the transmitting element and the further transmitting element. Thus, an upstream and a downstream measurement can be carried out. It is also conceivable that the further transmitting element is disposed so that the transmitting element is disposed between the further transmitting element and the receiving element for making measurements at different distances. Other positions are also conceivable, of course.

In one embodiment, the transmitting element (or the further transmitting element) is designed to generate Stoneley waves, more in particular Scholte waves, in the flow tube.

In an embodiment which comprises relatively few components, but which nevertheless functions with relatively great precision, it is conceivable that the transmitting element is designed to function also as a receiving element. Analogous thereto, it is also conceivable that (possibly additionally) the receiving element is designed to function also as a transmitting element.

In one embodiment, the flow tube is a straight tube in order to effect a substantially uniform flow in the flow tube.

A suitable influencing element may be a material layer which influences the portion of the ultrasonic waves. In one embodiment, the material layer for deflecting the ultrasonic waves is made up of a material layer which comprises an epoxy or an epoxy composite.

Using simple means, the flow meter can be provided with the influencing element in the form of a material layer if the flow tube, the transmitting element and/or the receiving element are moulded in a material layer, such as epoxy, for example, or if the assembly of the flow tube, the transmitting element and the receiving element is moulded in the material layer.

According to one aspect, the invention provides a method for measuring the rate of a flow, using an ultrasonic flow meter according to the invention, comprising the steps of:
  emitting ultrasonic waves by means of the transmitting element;
  registering the emitted ultrasonic waves by means of the receiving element;
  determining the rate of the flow on the basis of the registered ultrasonic waves.

According to the invention, the method comprises the step of influencing the velocity and/or the direction of a portion of the ultrasonic waves, using the influencing element. Said influencing may comprise deflecting, delaying, accelerating and/or absorbing the waves. As already explained in the foregoing, it is assumed that thus a portion of the ultrasonic waves, which is not a measure of the rate of the flow to be measured, is influenced to such an extent that said waves cannot reach the receiver, or reach the receiver outside the time window being used for the measurement. Thus an improved signal/noise ratio is obtained at the receiver.

In one embodiment, the transmitting element generates a surface wave (Stoneley wave), which surface wave propagates between the interface of the flow tube and the flow whose flow rate is to be determined.

The portion of the ultrasonic waves that is not a measure of the ultrasonic waves is supposed to be the waves that merely propagate through the flow tube. In one embodiment, the method therefore comprises the step of deflecting at least a portion of the emitted waves in the outer jacket of the flow tube.

The invention further relates to a method for manufacturing a flow meter, in particular a flow meter according to the invention as described above, wherein the method comprises the step of providing an ultrasonic flow meter comprising at least a flow tube, a transmitting element and a receiving element, after which at least one of the transmitting element, the receiving element or the flow tube is surrounded with an influencing element for influencing the velocity and/or the direction of at most a portion of the ultrasonic waves. Preferably, the influencing element is configured in the manner already described above with reference to the flow meter according to the present invention.

Thus, a flow meter according to the present invention is formed in a simple manner.

The method may in particular comprise the step of moulding the assembly of flow tube, transmitting element and receiving element in a material layer that forms the influencing element. The method may in that case comprise the step of surrounding one of the flow tube, the transmitting element and the receiving element by the influencing element in liquid form.

Following that, the influencing element in liquid form can be cured, so that a solid material layer is obtained.

The aforesaid moulding and/or dipping in a liquid material and subsequent curing can be realised in a simple manner if the influencing element is an epoxy or an epoxy composite.

The invention will now be explained in more detail by means of a description of a few possible embodiments as shown in the appended figures. In the figures.

Figure 1:
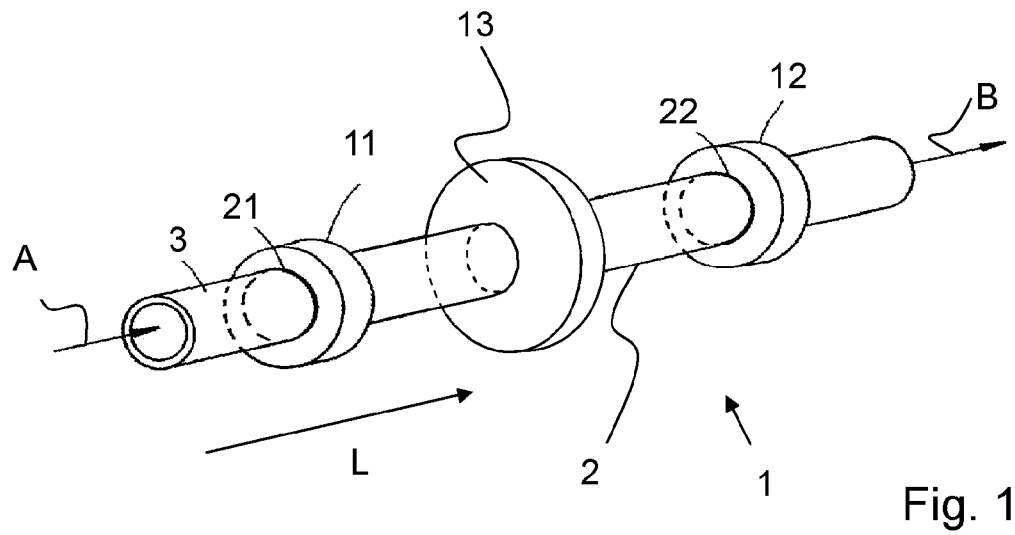
FIG. 1 is a perspective view of a first embodiment of the flow meter according to the present invention.

FIG. 1 shows a flow meter 1 according to the present invention in perspective view. The flow meter 1 comprises a flow tube 2 for the medium whose flow is to be measured. The flow tube has an outer jacket 3. The flow tube is provided with an inlet A and an outlet B. The flow tube is preferably an elongate, straight tube 2, which extends in a longitudinal direction L.

Provided on the outer jacket 3 of the flow tube 2 is a first oscillator 11, which is ring-shaped in the illustrated embodiment, and which is provided entirely around the circumference of the tube 2. The first oscillator 11 is in acoustic contact with the outer jacket 3 of the flow tube via an acoustically conductive layer 21. Provided at a position longitudinally spaced from the first oscillator 11 is a second oscillator 12, which is likewise in contact with the outer jacket 3 of the flow tube 2, in this case via an acoustically conductive layer 22.

The first oscillator 11 and/or the second oscillator 12 may be configured as piezo elements. The piezo element may in that case comprise a piezo film. It is further conceivable that the receiving element is a PZT element, comprises a PVDF material or is a ceramic crystal.

It is conceivable that the first oscillator 11 is a transmitting element and that the second oscillator 12 is a receiving element, i.e. that the receiving element is disposed downstream of the transmitting element. Alternatively it is of course conceivable that, on the contrary, the transmitting element is disposed downstream of the receiving element.

The illustrated configuration of the ring-shaped oscillator 11 provided around the flow tube 2, which functions as a transmitting element, is supposed to generate so-called Stoneley waves in the flow tube 2. A surface wave occurs at the interface of a solid material (the inner jacket of the flow tube 2) and the fluid whose flow rate is to be determined. Said Stoneley wave is influenced by the flow of the medium whose flow rate is to be determined. A portion of the ultrasonic waves being generated will not be Stoneley waves, however, but propagate entirely in the solid material of the flow tube 2, for example in the part near the outer jacket 3 of the flow tube 2. This wave does not contain any information on the flow whose flow rate is to be determined, and actually disturbs the signal being measured.

To prevent this disturbance, the flow meter 1 according to the present invention is provided with an influencing element in the form of a ring-shaped material layer 13 between the transmitting element 11 and the receiving element 12, as shown in FIG. 1. The ring-shaped material layer 13 is in acoustic contact with the outer jacket 3 of the flow tube. The ring-shaped material layer 13 causes the emitted ultrasonic waves propagating in the outer jacket 3 to be influenced to such an extent that said waves are unable to reach the receiver or do not reach the receiver until after the time window that is used for the measurement. The result is, therefore, that it is possible to realise an improved signal/noise ratio, which is more representative of the flow.

The influencing element may be designed for deflecting, delaying, accelerating and/or absorbing the aforesaid portion of the ultrasonic waves. In the illustrated embodiment, the material layer 13 is an epoxy layer, which is supposed to absorb the portion of the ultrasonic waves, or at least influence it (change its direction) to such an extent that the waves do not arrive at the receiving element 12, or much sooner or not until much later than the Stoneley waves.

Figure 2:
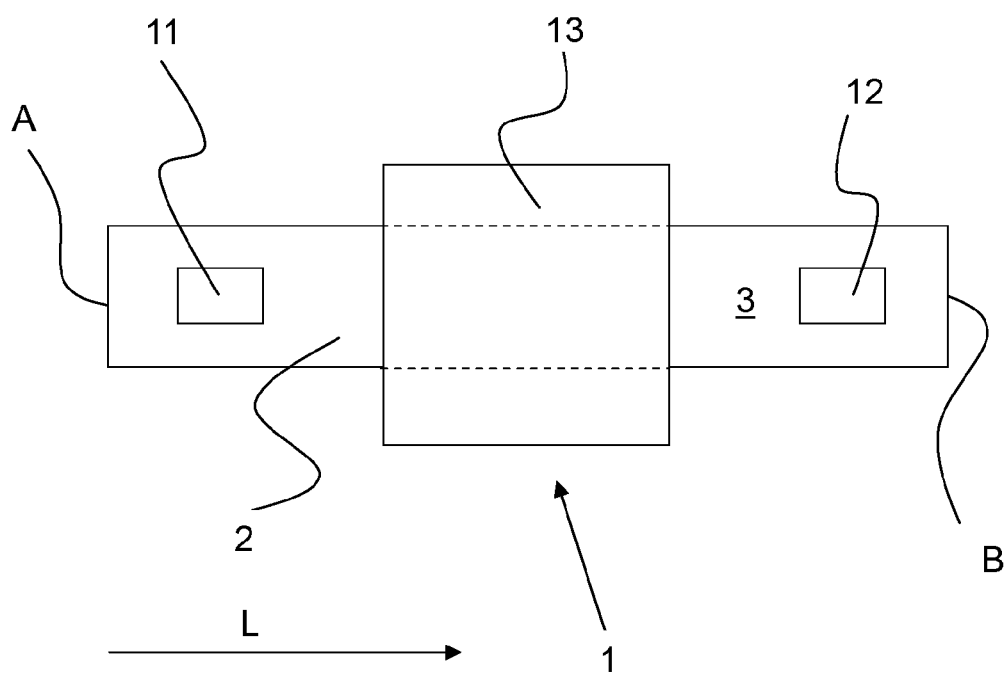
FIG. 2 is a schematic side view of a second embodiment of the flow meter according to the present invention.
Figure 3:
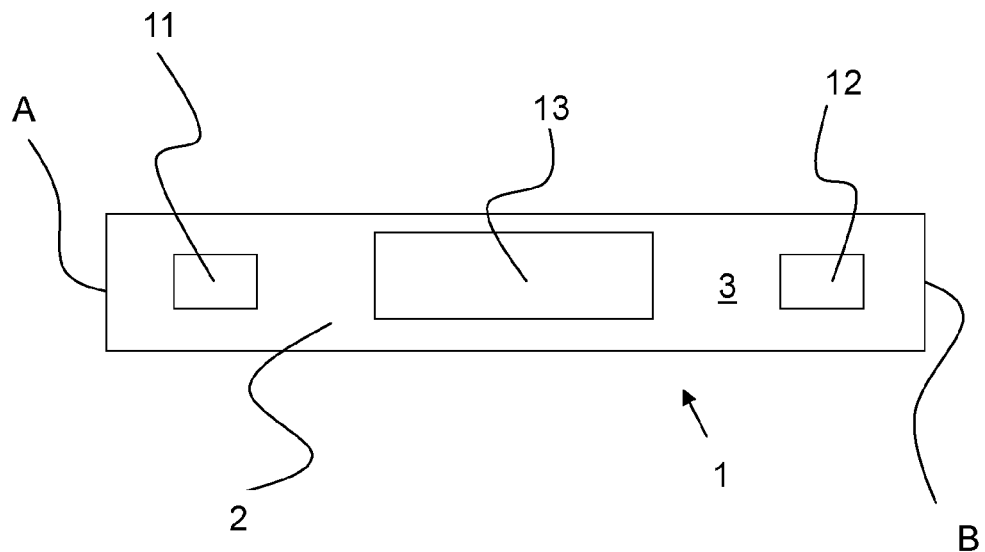
FIG. 3 is a schematic side view of a third embodiment of the flow meter according to the present invention.
Figure 4:
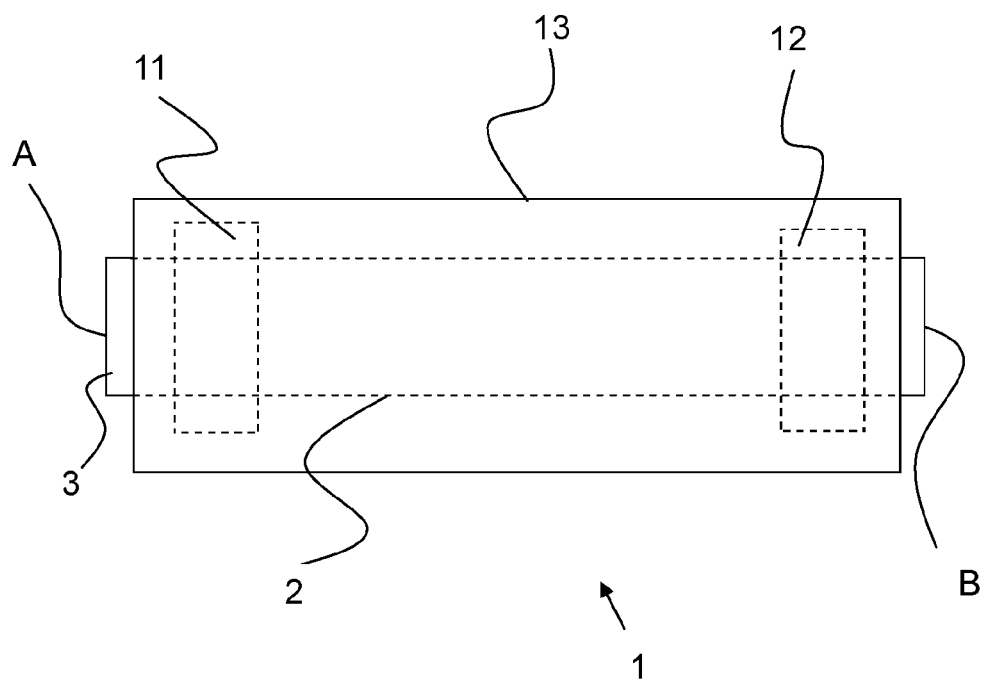
FIG. 4 is a schematic side view of a fourth embodiment of the flow meter according to the present invention.

Further possible embodiments are shown in FIGS. 2-4, in which like parts are indicated by the same numerals.

FIG. 2 shows that the transmitting element 11 and the receiving element 12 are not provided entirely around the flow tube, but cover only part of the outer jacket 3. The influencing element 13, on the other hand, is still provided entirely around the outer jacket 3.

FIG. 3, however, shows that it is conceivable that the influencing element 13 need not be provided entirely around the outer jacket 3, but that it is also possible for the influencing element 13 to be provided in such a manner that it is located in the path of a straight connecting line between the transmitting element 11 and the receiving elements 12.

FIG. 4 shows a preferred embodiment, which is relatively easy to manufacture, in which a ring-shaped transmitting element 11 and a ring-shaped receiving element 12 are used.

Said transmitting and receiving elements are in acoustic contact with the outer jacket 3 of the flow tube 2. The influencing element 13 is provided in such a manner that it fully surrounds the assembly of the flow tube, the transmitting element 11 and the receiving element 12. In a special embodiment this is possible by moulding the assembly in a material layer suitable for that purpose, which is designed to influence the portion of the ultrasonic waves in such a manner that said waves reach the receiving element outside the relevant time window. A suitable material is epoxy, for example, or a composite thereof. A suitable material for the flow tube may be a metal, such as a (stainless) steel tube. As already said before, also other materials are conceivable, such as hastelloy, or a non-metal, such as teflon, PEEK, glass or a ceramic material.

Figure 5:
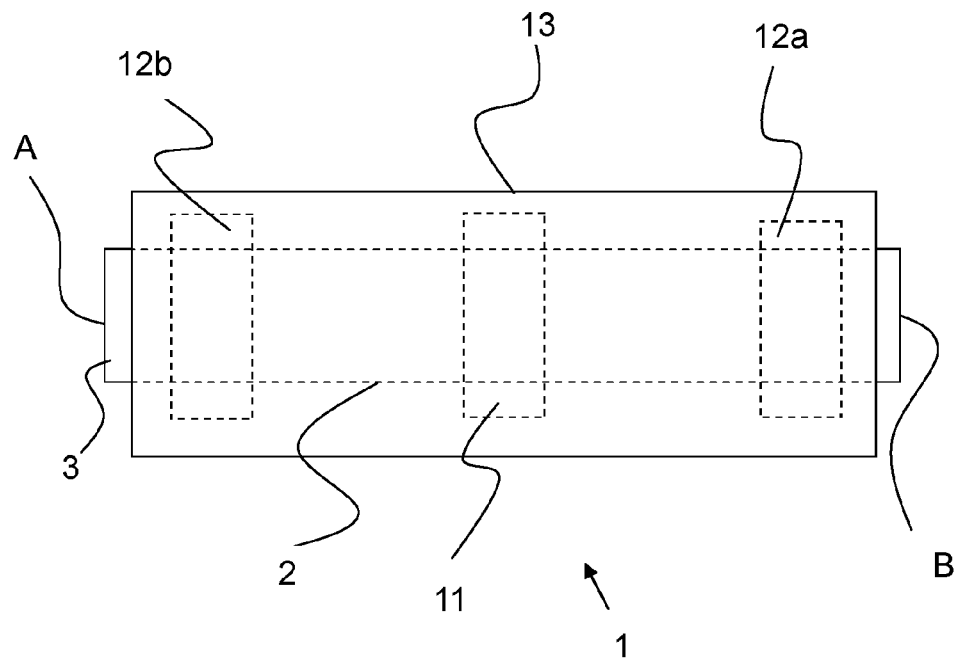
FIG. 5 is a schematic side view of a fifth embodiment of the flow meter according to the present invention.

FIG. 5 shows another embodiment that is preferred. FIG. 5 shows a sensor device 1 comprising a ring-shaped transmitting element 11, and two receiving elements 12a, 12b disposed upstream and downstream thereof, respectively. The transmitting element 11 and the receiving elements 12a, 12b are in acoustic contact with the outer jacket 3 of the flow tube. The influencing element 13, in the form of an epoxy or a composite thereof, surrounds the assembly of the tube 2 and transmitting and receiving elements 11, 12a, 12b, as already described above with reference to FIG. 4. Using such an embodiment, precise measurements can be realised.

Figure 6:
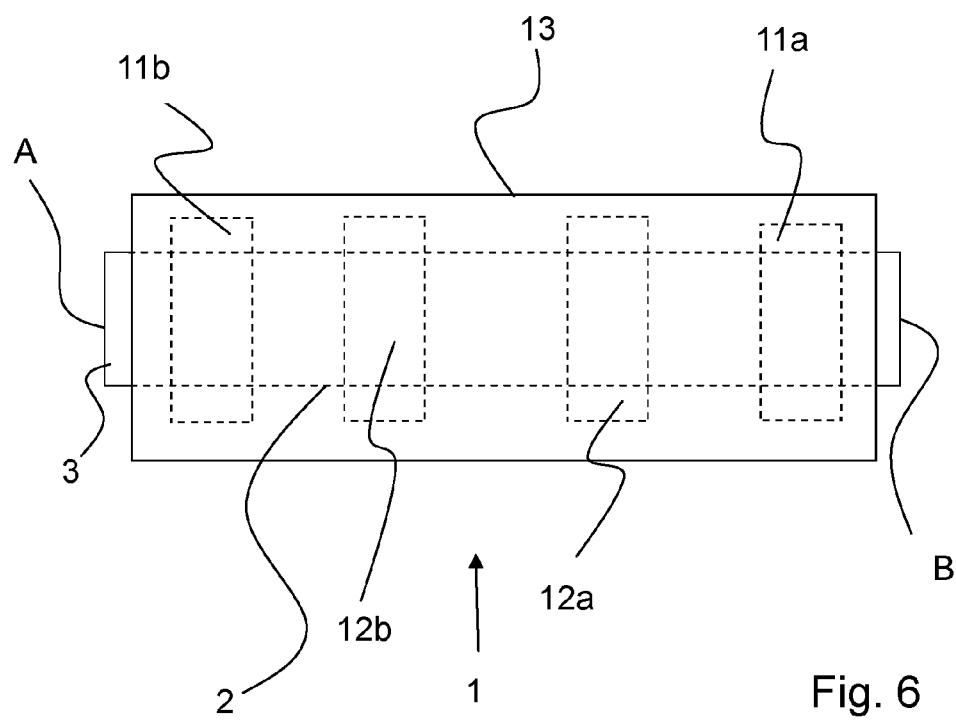
FIG. 6 is a schematic side view of a sixth embodiment of the flow meter according to the present invention.

FIG. 6 shows another embodiment, comprising a sensor device 1 with two spaced-apart ring-shaped transmitting elements 11a, 11b and, disposed therebetween, two spaced-apart receiving elements 12a, 12b. The influencing element 13 surrounds the assembly of the tube and the transmitting and receiving elements 11a, 11b, 12a, 12b. In such an embodiment, individual upstream and downstream measurements are possible, so that different measurements can be combined, therefore. It is also conceivable in that regard for the transmitting and receiving elements to be exchanged in advance, so that the receiving elements will be located furthest upstream and downstream, respectively. Such an exchange can also take place in a controlled manner, using a control unit, for example, so that a switchover of transmitter and receiver is possible during use. As a result, measurements can be carried out in different ways, resulting in a higher degree of precision.

The measurements are carried out in order to obtain two parameters. The first parameter is the time difference between the upstream measurement and the downstream measurement, and the second parameter is the propagation rate of the ultrasonic wave. It is noted, moreover, that it is not the sound velocity in the liquid that is measured here. The propagation rate being measured is related to the fluid velocity.

The upstream measurement and the downstream measurement may furthermore be correlated with each other, and from the result thereof the time difference can be determined, on the basis of which a measure of the flow can be further determined. Such a correlation between wave fronts is known per se to the skilled person in the field of general signal processing.

Figure 7A:
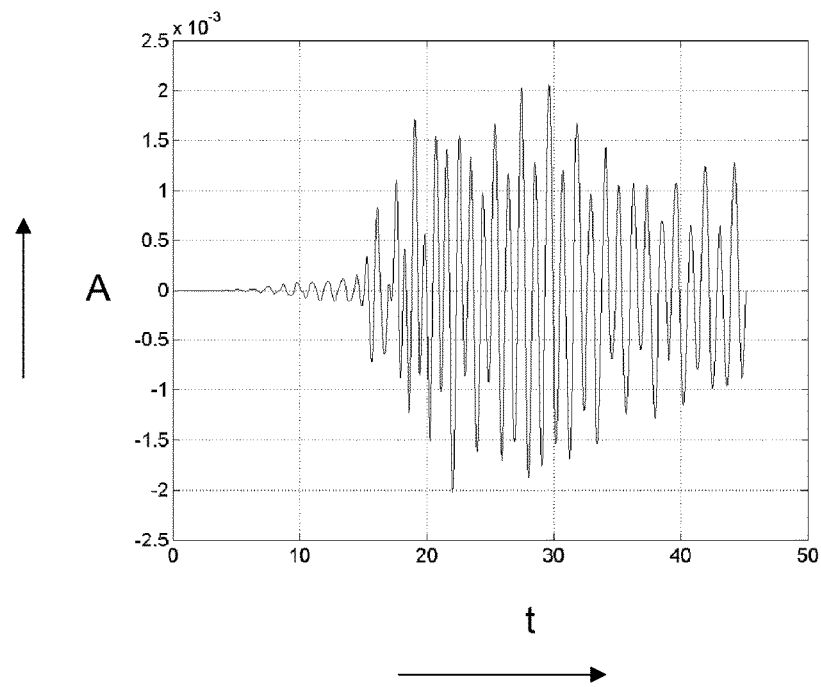
FIG. 7a is a graph showing the amplitude as a function of time of a signal obtained by means of a flow meter according to the prior art.

FIG. 7a shows a signal obtained by means of a flow meter comprising a transmitting element and a receiving element, wherein the tube is not provided with an influencing element. FIG. 7a is a graph showing the amplitude (A, vertical axis) of the signal as a function of time (t, horizontal axis). From the graph it is apparent that the measured signal is composed of a complex wave signal; determining the time difference therefrom is extremely difficult.

Figure 7B:
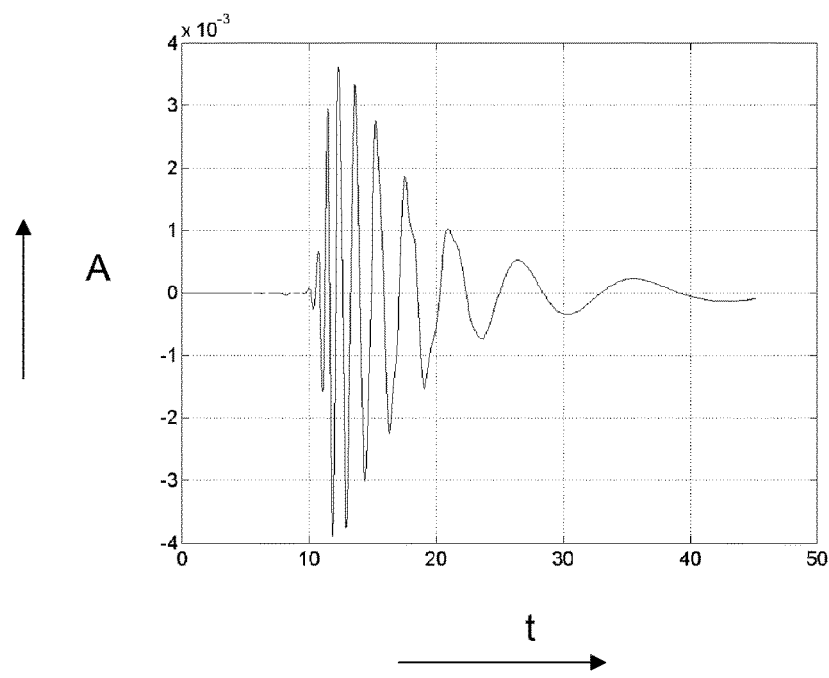
FIG. 7b is a graph showing the amplitude as a function of time of a signal obtained by means of a flow meter according to the invention.

FIG. 7b shows a signal obtained by means of the flow tube used for obtaining the signal shown in FIG. 7a, which flow tube is in this case provided with the influencing element according to the invention. In this case the flow tube provided with the transmitting element and the receiving element is moulded in an epoxy layer which is relatively thick. The figure clearly shows that, using the same settings, an improved signal is obtained with the device according to the present invention because a higher amplitude of the signal is obtained. A possible explanation for this is that the transmitter and the receiver are forced to transmit and receive the desired vibration due to the use of the influencing element, so that they are more sensitive to the desired signal and thus a higher amplitude can be measured.

The skilled person will appreciate that the invention has been explained in the foregoing with reference to preferred embodiments of the invention. The invention is not limited to these embodiments, however.

Thus it is conceivable, for example, that additional transmitting and/or receiving elements are provided. Thus it is conceivable to use an embodiment comprising two longitudinally spaced transmitting elements, with a receiving element disposed therebetween. Furthermore it is conceivable to use an embodiment comprising two longitudinally spaced receiving elements, with the transmitting element disposed therebetween. The use of additional transmitters and/or receivers is also conceivable, of course, in which case an (additional) influencing element, for example in the form of a material layer, may be provided as desired between a respective transmitting element and a receiving element associated therewith.

Accordingly, various modifications are conceivable within the framework of the invention. The scope of the protection sought is determined by the appended claims.

The invention claimed is:

1. An ultrasonic flow meter comprising a flow tube for a fluid whose flow rate is to be determined, wherein the flow meter comprises a transmitting element for emitting ultrasonic waves which is provided on the outer jacket of the flow tube, a receiving element for the ultrasonic waves which is provided on the outer jacket of the flow tube axially spaced from the transmitting element, characterized in that an influencing element is provided on at least a portion of a part of the flow tube that extends from the transmitting element up to and including the receiving element, which influencing element functions to influence the velocity and/or the direction of at most a portion of the ultrasonic waves.

2. The flow meter according to claim 1, wherein the influencing element is designed to deflect, delay, accelerate, and/or absorb said portion of the ultrasonic waves.

3. The flow meter according to claim 1, wherein the influencing element extends the full distance between the transmitting element and the receiving element.

4. The flow meter according to claim 1, wherein the transmitting element and/or the receiving element is surrounded by the influencing element.

5. The flow meter according to claim 1, wherein the influencing element fully surrounds the flow tube in circumferential direction.

6. The flow meter according to claim 1, wherein the thickness of the influencing element is greater than the thickness of the transmitting element and/or the receiving element.

7. The flow meter according to claim 1, wherein the transmitting element and/or the receiving element comprises a piezo element.

8. The flow meter according to claim 7, wherein the piezo element comprises a piezo film.

9. The flow meter according to claim 1, wherein the receiving element comprises a PZT material.

10. The flow meter according to claim 1, wherein the transmitting element and/or the receiving element is provided at least substantially entirely around the flow tube.

11. The flow meter according to claim 1, further comprising a further receiving element for the ultrasonic waves, which is provided on the outer jacket of the flow tube.

12. The flow meter according to claim 11, wherein the further receiving element is axially spaced from the transmitting element such that the transmitting element is disposed between the receiving element and the further receiving element.

13. The flow meter according to claim 1, wherein the transmitting element is configured to generate Stoneley waves in the flow tube.

14. The flow meter according to claim 1, wherein the transmitting element is configured to function also as a receiving element and/or wherein the receiving element is designed to function also as a transmitting element.

15. The flow meter according to claim 1, wherein the flow tube is a straight tube.

16. The flow meter according to claim 1, wherein the influencing element comprises a material layer.

17. The flow meter according to claim 16, wherein the material layer is an epoxy or an epoxy composite.

18. The flow meter according to claim 17, wherein the assembly of the flow tube, the transmitting element and the receiving element is moulded in the epoxy or the epoxy composite such that the transmitting element and the receiving element are surrounded by the epoxy or the epoxy composite.

19. A method for measuring the rate of a flow using an ultrasonic flow meter according to claim 1, comprising the steps of:
   emitting ultrasonic waves by means of the transmitting element;
   registering the emitted ultrasonic waves by means of the receiving element; and
   determining the rate of the flow on the basis of the registered ultrasonic waves;
wherein said method is characterized by the step of influencing the velocity and/or the direction of a portion of the ultrasonic waves using the influencing element.

20. The method according to claim 19, wherein the influencing element influences at least a portion of the emitted waves in the outer jacket of the flow tube.

21. The method according to claim 19, wherein the transmitting element generates a surface wave, which surface wave propagates between the interface of the flow tube and the flow whose flow rate is to be determined.

22. A method for manufacturing an ultrasonic flow meter comprising the steps of:
   providing an ultrasonic flow meter comprising at least a flow tube, a transmitting element and a receiving element; and
   surrounding at least one of the transmitting element, the receiving element or the flow tube with an influencing element for influencing the velocity and/or the direction of at most a portion of the ultrasonic waves.

23. The method according to claim 22, wherein said surrounding step comprises surrounding with the influencing element in liquid form.

24. The method according to claim 23, further comprising the step of curing the influencing element in liquid form.

25. The method according to claim 22, wherein the influencing element is an epoxy or an epoxy composite.

* * * * *